United States Patent [19]
Sandholzer

[11] Patent Number: 5,740,869
[45] Date of Patent: Apr. 21, 1998

[54] CULTIVATING TOOL

[76] Inventor: Hartwig Sandholzer, Bessemer Strasse 8, D-60388 Frankfurt, Germany

[21] Appl. No.: 414,422

[22] Filed: Mar. 31, 1995

[30]  Foreign Application Priority Data

Aug. 10, 1994 [DE] Germany ........................ 9412819 U
Aug. 18, 1994 [DE] Germany ........................ 9413329 U

[51] Int. Cl.⁶ .................................................. A01B 1/00
[52] U.S. Cl. .......................... 172/378; 172/371; 294/55.5
[58] Field of Search .................................. 172/378, 371; 294/55.5; D8/1–13; 56/27.5

[56]  References Cited

U.S. PATENT DOCUMENTS

| 234,855 | 11/1880 | Daniels | 294/55.5 |
| 562,248 | 6/1896 | Scott | 172/378 |
| 747,986 | 12/1903 | Layne | 294/55.5 |
| 1,302,375 | 4/1919 | Jack | 294/55.5 |
| 1,577,927 | 3/1926 | Morse | 172/378 |
| 2,492,035 | 12/1949 | Doble | 172/378 X |
| 2,749,104 | 6/1956 | Barrett | 262/26 |
| 2,809,067 | 10/1957 | Macchi | 294/50.7 |
| 3,129,771 | 4/1964 | Lidstone | 172/25 |
| 3,333,881 | 8/1967 | Hollinger | |
| 3,771,794 | 11/1973 | Crockett | 172/378 X |
| 4,905,768 | 3/1990 | Lorenz | 172/378 X |
| 5,207,466 | 5/1993 | Ohlson | 172/378 |
| 5,360,071 | 11/1994 | Bergendorf | 172/378 |
| 5,441,118 | 8/1995 | Cruz, Jr. | 172/378 |

FOREIGN PATENT DOCUMENTS

| 0264711 | 4/1988 | European Pat. Off. | A01B 1/06 |
| 2631511 | 11/1989 | France . | |
| 9320016 | 2/1994 | Germany | A01B 1/00 |

Primary Examiner—Terry Lee Melius
Assistant Examiner—Victor Batson
Attorney, Agent, or Firm—Webb Ziesenheim Bruening Logsdon Orkin & Hanson, P.C.

[57]  ABSTRACT

The present invention is a cultivating tool which includes a rod having a handle on one end and a tool head with soil-breaking elements on the opposite end of the rod. The tool head can take the form of a fork spade with tines or cutting blades arranged in at least two planes.

9 Claims, 2 Drawing Sheets

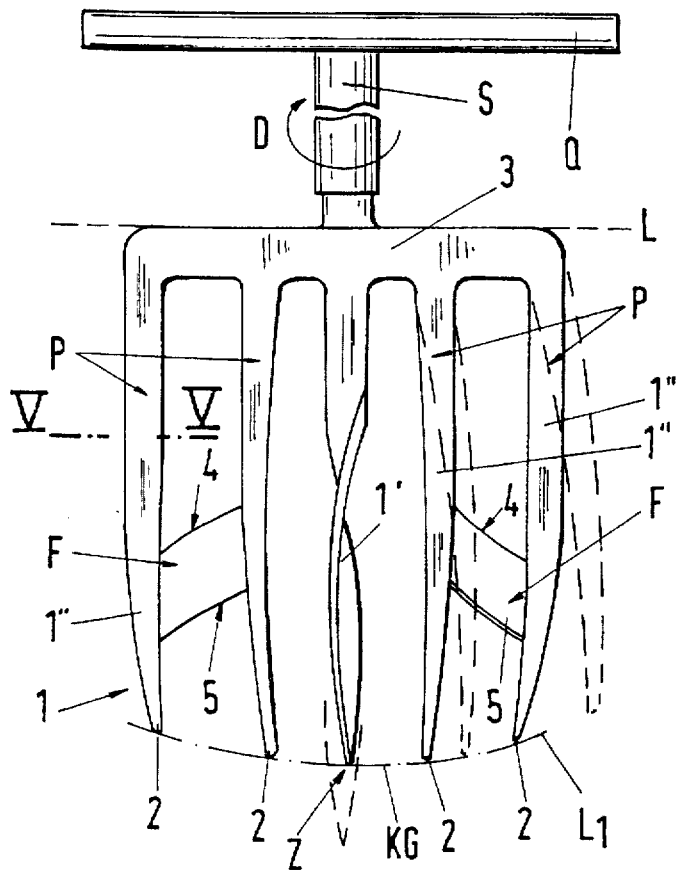
Fig.1
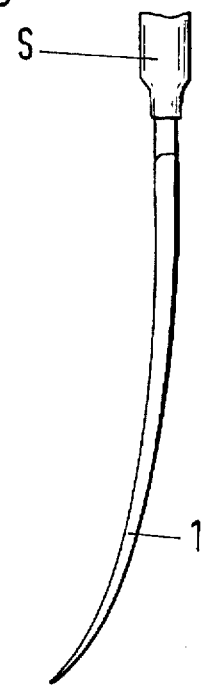
Fig.4 PRIOR ART
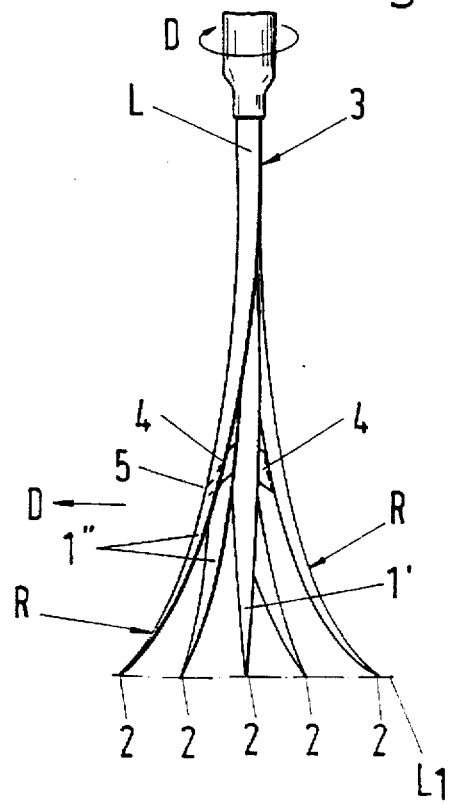
Fig.2
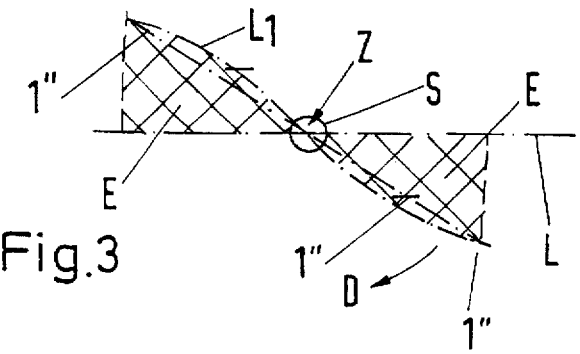
Fig.3
Fig.5

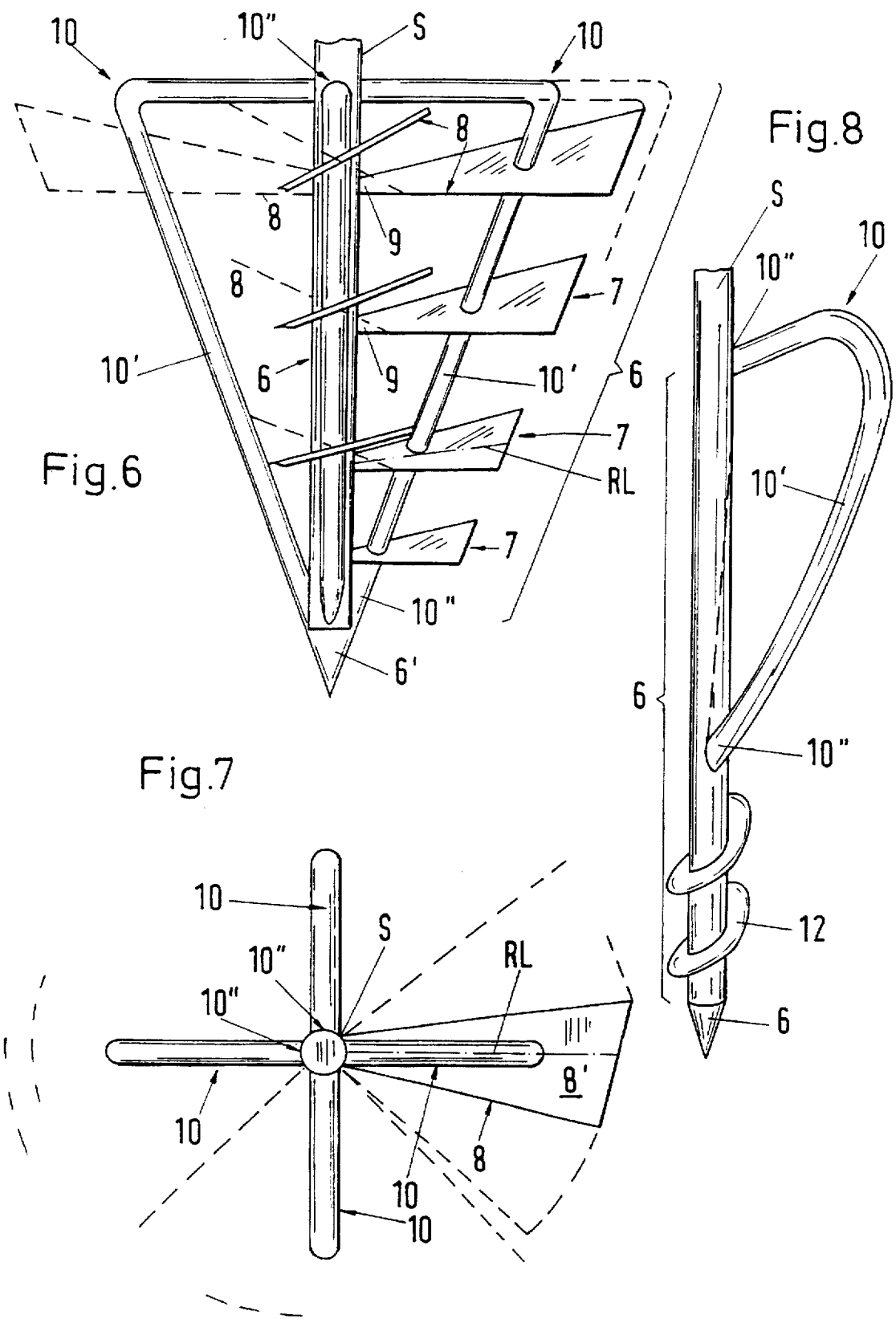

CULTIVATING TOOL

BACKGROUND OF THE INVENTION

1. Field of the Invention

This invention relates to new and useful improvements in cultivating tools.

More particularly, the present invention relates to an improved cultivating tool which can easily and conveniently be used in soft or hard ground to extract crab grass, weeds and the like, or for breaking up the soil.

2. Description of the Prior Art

Various forms of embodiment of cultivating tools of the afore-described type are known, for example, from European Patent 0 264 711 or U.S. Pat. Nos. 2,809,067 and 3,129,771. The service of tools of this type is more or less satisfactory in response to the degree of hardness of the soil to be broken up. The disadvantage involved therewith resides in that in view of the configuration of the tool a bore kernel is formed when penetrating the soil which, depending on the consistency of the ground, is extracted during withdrawal of the tool or during removal of the tool by rotation in the opposite direction. The tool according to European Patent 0 264 711 substantially corresponds to the one according to U.S. Pat. No. 2,749,104 except that small boring bits are provided on the ends of the tines as the tool is an Auger Drill Head.

Moreover, a cultivating tool is known from German Gebrauchsmuster 9 320 016 in which blade-type elements are provided cross-wise on a shank. However, these blade-type elements are likely to break during rotation of the shank. Furthermore, this tool is designed to be driven into and withdrawn from soil only.

SUMMARY OF THE INVENTION

It is an object of the invention to provide an improved cultivating tool of the afore-mentioned type to the effect that the tool is of a simple but nevertheless stable construction, thereby being able to penetrate even heavy and hard soil and that—viewed in perpendicular projection—the whole of the soil area covered during rotation is broken up, thereby substantially avoiding a kernel formation.

As a further object, the present invention provides a cultivating tool with cutting elements acting in a direction transverse of the driving direction.

Another object of the invention is to design the cultivating tool with cutting elements which are stabilized to prevent them from breaking while penetrating the ground.

A cultivating tool according to the invention includes a rod having a handle on one end of the rod. A tool head comprising soil-breaking elements is provided on the other end of the rod, with the tool head being in the form of a fork spade having a shoulder piece and tines disposed thereon and with decentrally arranged tines forming an arc section. At least two tines provided externally of the central axis—starting from the shoulder piece—are deflected relative to the central axis toward both sides of the spade, with the tips of the tines terminating along a straight or a backward facing S-shaped line, as seen in plan view, angularly staggered relative to the straight line of the shoulder piece.

Another embodiment of the cultivating tool according to the invention includes a rod having a handle on one end of the rod. A tool head containing soil-breaking elements is provided at the other end of the rod, with the tool head comprising a central bar located at the end of the rod on which cutting blades are located in opposed relationship in at least two planes, with the cutting blades being angularly set relative to the central bar and being of differing radial lengths from plane to plane. The cutting blades are connected to brackets fixed to the central bar at a distance from their connection to the central bar.

For further comprehension of the invention, and of the objects and advantages thereof, reference will be had to the following description and accompanying drawings and to the appended claims in which the various novel features of the invention are particularly set forth.

BRIEF DESCRIPTION OF THE DRAWINGS

FIG. 1 is a front view of the cultivating tool according to a first embodiment;

FIG. 2 is a side view of the cultivating tool according to FIG. 1;

FIG. 3 is a plan view of the course of lines L and $L_1$;

FIG. 4 is a side view of a conventional fork spade for reference purposes;

FIG. 5 is a sectional view of a tine of the cultivating tool along line V—V in FIG. 1;

FIG. 6 is a side view of another form of embodiment of the cultivating tool;

FIG. 7 is a plan view of the form of embodiment according to FIG. 6; and

FIG. 8 is a special form of embodiment and arrangement of the cultivating tool according to FIG. 6.

DESCRIPTION OF THE PREFERRED EMBODIMENTS

The cultivating tool according to the invention comprise a rod S provided with a transverse handle Q, with the bottom end of the rod being in the form of a tool head provided with soil-breaking elements. First the tool according to the embodiment as shown in FIGS. 1 to 5 will be described. In the practice of the invention and as conveyed by FIGS. 1 and 2, it is important for a tool of this type that the tool head is in the form of a fork spade the bent tines 1 of which forming the soil-breaking elements—viewed from a center Z—are so deflected from the normal blade plane of the fork spade that the tine tips 2 terminate along a line $L_1$ angularly staggered over a line L of a spade shoulder 3. FIGS. 1 and 2 show, in solid lines, the preferred form of embodiment. Concerning the course of lines L and $L_1$ along which the tine tips 2 terminate, reference is made to FIG. 3 according to which line $L_1$ extends in the form of a flat backward facing S.

The arrangement of the tips 2 along line L1—irrespective of whether the same extends within a horizontal plane or in a ball-type plane KG (dash-dotted) open to the top—means (which is of decisive importance) that the tine 1" and the pairs of tines P on both sides of the central tines 1' are respectively oppositely deflected, as illustrated by FIG. 2. As shown in FIG. 2, the radius of curvature R of the tines in the bottom third of the length thereof can be slightly smaller than that in the part of the tines thereabove. Ploughshare-type cutting bridges 4 may be provided between the outer pairs P of tines.

As shown in FIGS. 2 and 3, the cultivating tool is forced into the ground while rotating in the direction of arrow D. Depending on the desired depth of the soil breaking it will then not be forced any longer but only continually rotated. The areas designated by E and hatched cross-wise are spatially wound areas in which the pairs P of the bent tines 1 extend. The areas F of the cutting bridges 4 are correspondingly wound.

The form of embodiment of the cultivating tool of the invention according to FIGS. 6 to 8 distinguishes from the afore-described one in that plough-shaped and angularly set cutting blades 8 of an upwardly increasing radial length RL are radially arranged on a central bar 6 provided on the rod end in opposing and superposed relationship in at least two planes 7 and are connected to brackets 10 fixed to the rod S at a distance from the rod shoulder 9 thereof.

To enable the tool to be driven into the soil by applying as little force as possible, the setting angle β of the cutting blades 8, advantageously, is so designed as to increase from bottom to top as shown in FIG. 6 yet to be explained hereinafter in closer detail.

As stated in the afore-going, the cutting elements 8 in the forms of embodiment according to FIGS. 6 to 8, for stability reasons, are arranged on brackets 10 extending within a plane intersecting the central bar 6. In addition, the two brackets 10 converge toward tip 6' of the bar 6. However, this is not intended to exclude that the long bracket bars 10' to a certain degree also can extend helically as shown in FIG. 8, involving the advantage that the long bracket bars 10' when driven into the soil in the direction of rotation do not perpendicularly engage the soil but rather at an inclination as do the cutting blades 8. In addition, the said brackets 10 involve the advantage that they additionally break up small cut earth clods. Moreover, as shown by FIG. 6, the brackets 10 pass through the cutting blades 8 meaning that such cutting blades 8 radially protrude beyond the brackets 10.

Equally for reasons of stability, the inner rod shoulders 9 of the cutting blades 8 are additionally fixed to rod S as by simple welding; this applies also to the passage areas of the brackets on the cutting blades 8. Also it will be possible, as shown in broken lines in FIG. 6, for the brackets 10 to be mounted outermost on the cutting blades 8. As shown in FIG. 8, also in this case the central bar 6, advantageously, protrudes beyond the bottommost cutting blade 8, and, in addition, can be provided with a screw thread 12.

The example of embodiment according to FIG. 6 is particularly easy to manufacture because the brackets 10 along with the cutting blades 8 can be individually premanufactured with the aid of a gauge means and can be welded together whereafter the individual brackets 10 uniformly distributed about the central bar 6 will be welded by the ends 10" thereof. The bracket bars 10' in view of the rotating cut in the soil, advantageously, in cross-section and in the direction of rotation, can be formed with a sharpened front face (not shown in any detail as readily apparent).

The language soil-breaking elements of "ploughshare-type configuration" refers to designs having the same or similar effect as the elements as shown, i.e. elements consisting, for example, of individual claws oriented in the same direction or forming screen-type structures.

The cutting blades 8 readily can be of a greater width as shown, for example, in broken lines in FIG. 7. In that case, a tool of the afore-described type is particularly suitable to excavate the broken soil cone to make, for example, planting holes.

As opposed to the form of embodiment shown in FIGS. 6,7 in which four brackets 10 staggered by 90° are provided, it will be possible to provide three brackets 10 staggered by 120° or two brackets 10 staggered by 180°.

While there are in this application specifically described the preferred embodiments which the invention may assume in practice, it will be understood that these embodiments of the same are shown for purposes of illustration, and that the invention may be modified and embodied in various other forms without departing from its spirit or the scope of the appended claims.

What I claim is:

1. A cultivating tool comprising:

a rod having a first end, a second end and a longitudinal axis;

a handle on said first end of said rod; and a tool head on said second end of said rod, said tool head configured as a fork spade having soil-breaking elements, with said tool head including a shoulder piece extending substantially along a line that intersects with the longitudinal axis of said rod and further including a plurality of tines, with said shoulder piece including a center on the line along which said shoulder piece extends, with at least two of said tines located on opposite sides of said center and deflected outwardly away from the line along which said shoulder piece extends in directions opposite to each other, and with a twisted central tine located at said center, wherein said tines adjacent said central tine are angularly offset relative to the line along which said shoulder piece extends.

2. The cultivating tool as defined in claim 1, wherein the central tine is of a greater length than the other tines.

3. The cultivating tool as defined in claim 1, wherein the deflection of said tines farther from the the central tine is greater than the deflection of said tines adjacent the central tine.

4. The cultivating tool as defined in claim 1, wherein ploughshare-type cutting bridges are provided between outer pairs of said tines.

5. The cultivating tool as defined in claim 1, wherein a radius of curvature of said tines spaced from said central tine in a bottom third of the length thereof is smaller than in a portion of said tines thereabove.

6. A cultivating tool comprising:

a rod having a first end, a second end and a longitudinal axis;

a handle on said first end of said rod; and a tool head on said second end of said rod, said tool head configured as a fork spade having soil-breaking elements, with said tool head including a shoulder piece extending substantially along a line that intersects with the longitudinal axis of said rod and further including a plurality of downwardly extending tines, wherein each of said tines is configured to enter into the soil, with said shoulder piece including a center on the line along which said shoulder piece extends and wherein at least two of said tines are located on opposite sides of said center and are deflected outwardly away from the line along which said shoulder piece extends in directions opposite to each other, and with each of said tines including a tip which terminates downwardly along a straight line angularly deflected relative to the line along which said shoulder piece extends with said tips configured to enter into the soil, and wherein a twisted central tine is located at said center and wherein said tines adjacent said central tine are angularly offset relative to the line along which said shoulder piece extends.

7. The cultivating tool as defined in claim 6, wherein said central tine is of a greater length than the other of said tines.

8. A cultivating tool comprising:

a rod having a first end, a second end and a longitudinal axis;

a handle on said first end of said rod; and a tool head on said second end of said rod, said tool head configured as a fork spade having soil-breaking elements, with said tool head including a shoulder piece extending substantially along a line that intersects with the longitudinal axis of said rod and further including a plurality of downwardly extending tines, wherein each of said tines is configured to enter into the soil, with said shoulder piece including a center on the line along which said shoulder piece extends and wherein at least two of said tines are located on opposite sides of said center and are deflected outwardly away from the line along which said shoulder piece extends in directions opposite to each other, and with each of said tines including a tip which terminates downwardly along a straight line angularly deflected relative to the line along which said shoulder piece extends with said tips configured to enter into the soil, and wherein the deflection of said tines farther from the center is greater than the deflection of said tines adjacent said center.

9. A cultivating tool comprising:

a rod having a first end, a second end and a longitudinal axis;

a handle on said first end of said rod; and a tool head on said second end of said rod, said tool head configured as a fork spade having soil-breaking elements, with said tool head including a shoulder piece extending substantially along a line that intersects with the longitudinal axis of said rod and further including a plurality of tines, with said shoulder piece including a center on the line along which said shoulder piece extends and wherein at least two of said tines are located on opposite sides of said center and are deflected outwardly away from said line along which said shoulder piece extends in directions opposite to each other, and with each of said tines including a tip that terminates downwardly along a backward facing S-shaped curve in plan view and angularly deflected relative to the line along which said shoulder piece extends.

* * * * *